United States Patent [19]

Stone

[11] Patent Number: 5,647,255
[45] Date of Patent: Jul. 15, 1997

[54] EXPANDABLE GASKET FOR A HEAD DISK ASSEMBLY OF A DISK DRIVE

[75] Inventor: Thomas R. Stone, San Francisco, Calif.

[73] Assignee: Quantum Corporation, Milpitas, Calif.

[21] Appl. No.: 534,428

[22] Filed: Sep. 27, 1995

[51] Int. Cl.[6] .................................................. B26D 1/18
[52] U.S. Cl. .................................. 83/19; 29/415; 29/416; 277/1
[58] Field of Search ........................ 29/415, 416, 425, 29/432, 432.1, 432.2; 83/18, 19; 264/153, 160; 277/1

[56] References Cited

U.S. PATENT DOCUMENTS

| | | |
|---|---|---|
| 3,438,117 | 4/1969 | Engleman . |
| 3,583,711 | 6/1971 | Engleman . |
| 3,766,629 | 10/1973 | Lechtenberg . |
| 4,060,015 | 11/1977 | Gros ........................................... 83/19 |
| 4,690,413 | 9/1987 | Adkins . |
| 4,712,146 | 12/1987 | Moon et al. . |
| 5,187,621 | 2/1993 | Tacklind . |

*Primary Examiner*—Scott Cummings
*Attorney, Agent, or Firm*—David B. Harrison; Debra A. Chun

[57] ABSTRACT

An expandable gasket for a head disk assembly, wherein the gasket is initially formed having a geometry that maximizes the number of gaskets realized per sheet of material used. The gasket includes a series of spaced-apart thinned pivot regions and is expanded from an initial relatively closed, material-saving geometry to a second, open geometry dimensioned to be disposed between a top cover and a base of a disk drive. In addition, the transformation from first to second geometries is accomplished without stretching, distorting, buckling or tearing the elongate pivot regions.

11 Claims, 15 Drawing Sheets

EXPANDABLE GASKET FOR A HEAD DISK ASSEMBLY OF A DISK DRIVE

BACKGROUND OF THE INVENTION

1. Field of the Invention

The invention relates generally to disk drives and more particularly to an expandable gasket that seals the disk drive's head/disk assembly.

2. Description of the Prior Art

Generally, industrial gaskets are stamped from a sheet of material suitable for their intended application. A stamping apparatus may include a die configured in a predetermined geometry such that when mated with a sheet of gasket material, an image of the die geometry will be punched thereon. The sheet of gasket material may then be further processed to separate the stamped die image from the sheet of gasket material, wherein the remainder of material is conventionally discarded. Gaskets are fabricated in a multiplicity of geometries and hence there must be a corresponding number of die geometries. Depending on the particular application, sheet material selected for a gasket can be relatively expensive, and it becomes useful to minimize waste.

Figure 1:
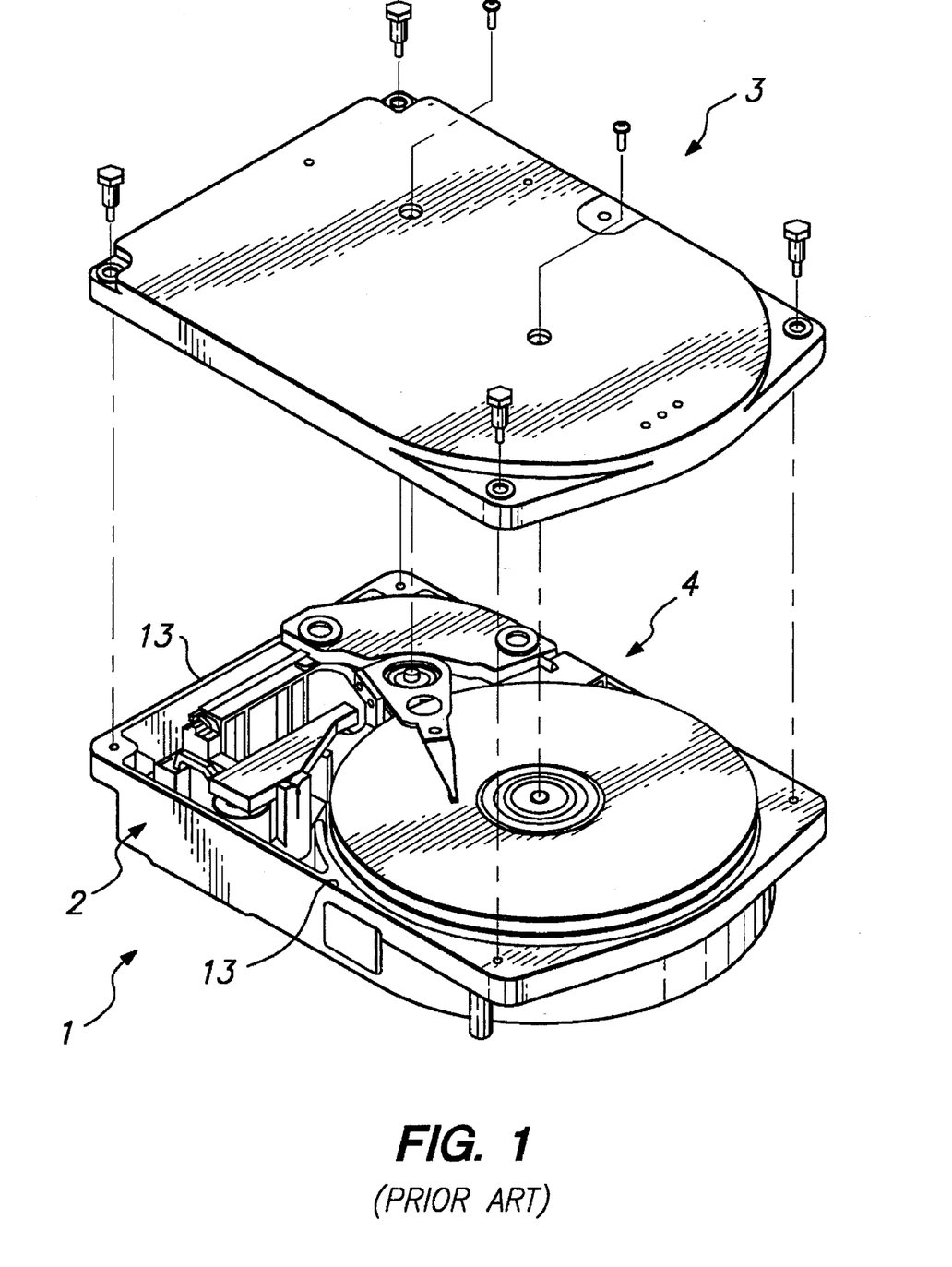
FIG. 1 is an isometric view of a conventional disk drive.
Figure 2:
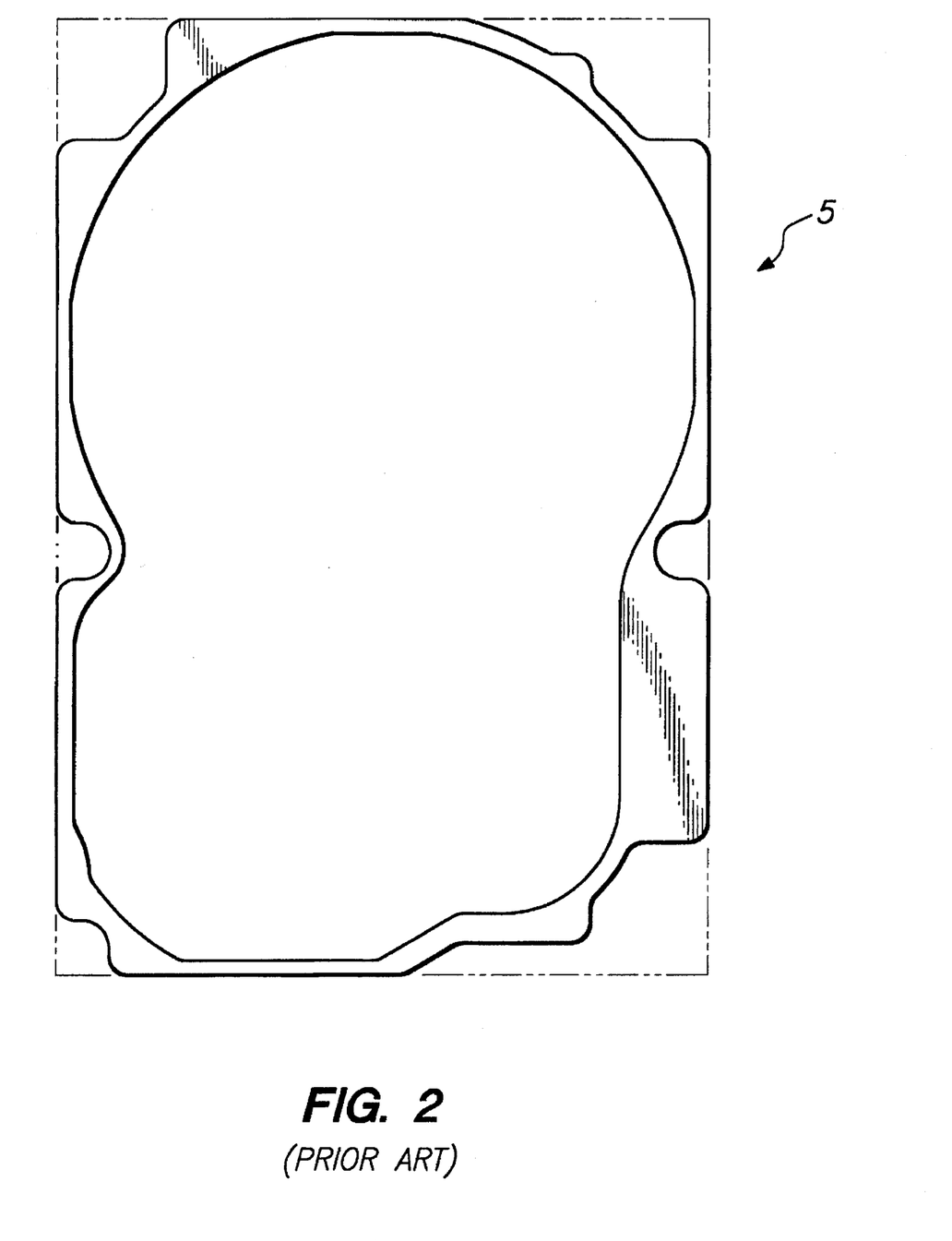
FIG. 2 is a plan view of a conventional sealing gasket for sealing a cover to a disk drive HDA.

As illustrated in FIG. 1 a hard disk drive head disk assembly ("HDA") 1 includes a base 2 and a stamped, conformable top cover 3 for enclosing the base 1 along with delicate internal components 4 comprising a head-disk interface. The top cover 3 is conformably mated with the base 2, and a gasket 5, FIG. 2, is placed between facing edges of the cover 3 and base 2 to form an air tight seal, isolating the disk drive's internal components 4 from any contaminants present in an environment external to the head disk assembly 1. In disk drive technology, it is critical to maintain a contaminant-free operating environment within the head disk assembly 1, so that contaminants, particularly microscopic particles, do not come between the flying head and the disk storage surface.

Figure 3:
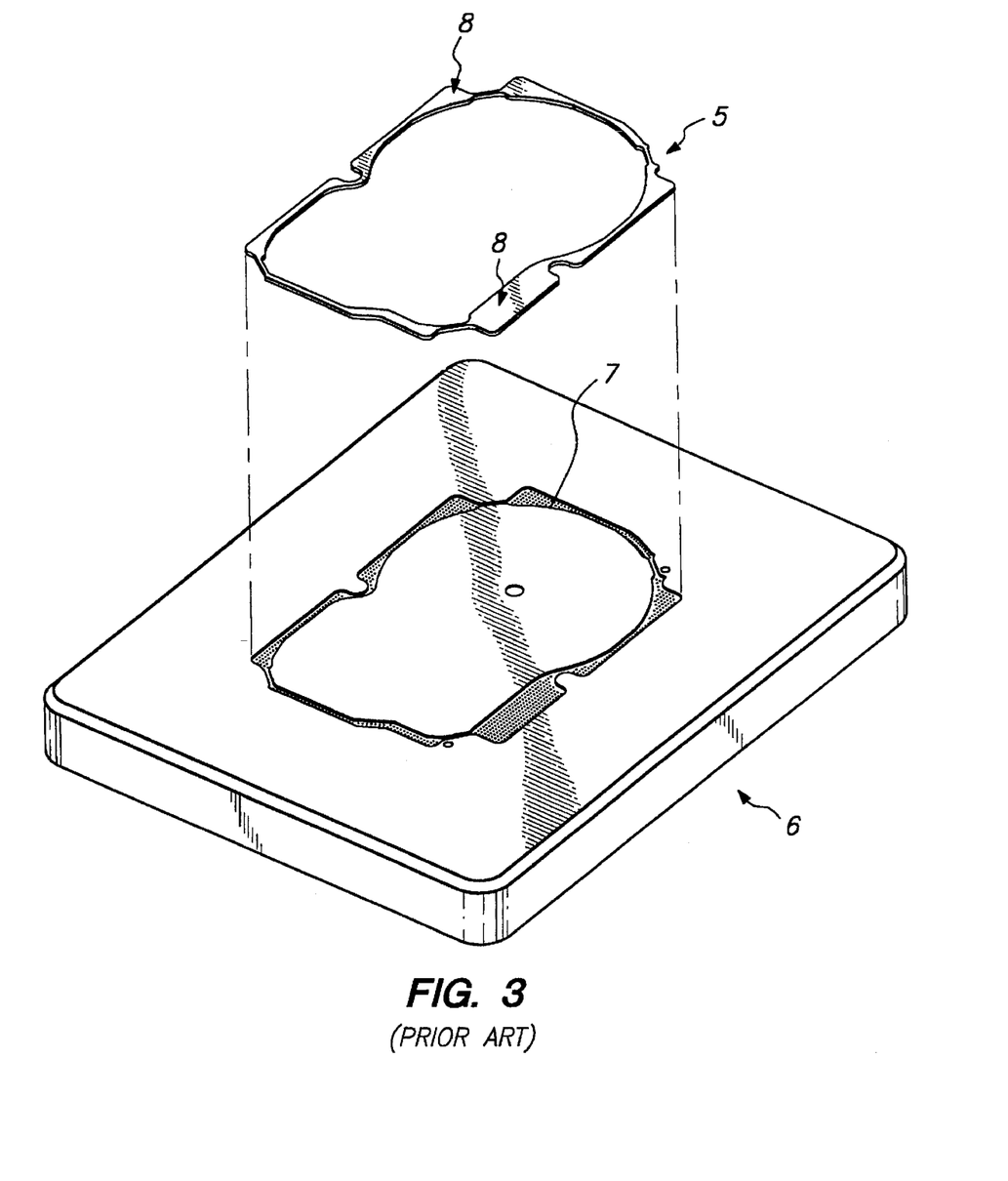
FIG. 3 is an isometric, somewhat diagrammatic view of a conventional fixture for receiving and handling the FIG. 2 sealing gasket.

In assembly of die-cut sheet gaskets 5, it is not uncommon to use vacuum fixtures, such as the fixture 6 shown in FIG. 3. In this example the fixture 6 may be milled from a block of aluminum alloy. The block 6 includes a milled recess 7 closely matching a final design outline of the gasket 5. The milled recess 7 also defines a series of small holes which lead to an interior hollow plenum in communication via a fitting and suitable conduit with a vacuum source, such as a vacuum pump (not shown). This arrangement enables the recess 7 to be de-pressurized relative to ambient air pressure, thus sucking the gasket 5 firmly into the milled recess 7 and holding the gasket flat within the recess. Once the gasket 5 is positioned and held in place on the fixture 6 by vacuum suction, a paper release liner covering an adhesive coating on an upward-facing surface 8 of the gasket 5 is removed (or an adhesive coating is applied to the surface 8), and the cover 3 is lowered into position over the gasket 5. Preferably, tooling pins or features on the fixture 6 (not shown in FIG. 3) aid in precisely aligning the cover 3 relative to the fixture 6 and gasket 5. Once the gasket 5 is affixed to the cover 3, vacuum is removed from the fixture 6, and the cover-gasket assembly is then removed and ready for installation onto the base 2. In an automated assembly process, the fixture 6 would be upside down, compared with the FIG. 3 orientation, so that the fixture 6 could robotically remove the adhesive-coated gasket 5 from a carrier sheet using vacuum, move the gasket 5 to the cover 3, press the gasket 5 into place on the cover, then release the vacuum, and recycle for the next automated gasket-handling operation.

In the case of disk drive gaskets 5, materials chosen for the gasket are typically characterized by low outgassing, low compression set, and a general compatibility with disk drive internal components. Consequently, materials such as Poron (™) high density polyurethane foam are preferred materials. However, as mentioned, such materials can be relatively expensive. As will be appreciated from the FIG. 2 example, the disk drive gasket 5 is characterized as having a narrow band geometry, generally following an outer edge having narrowed regions 13 of the cast "deep dish" base 2, which encloses a relatively large space. Thus, waste and discard of the majority of unused remaining material after gaskets 5 have been punched and separated from their respective sheets is expensive and undesirable. In addition, Poron (™) high density polyurethane can be environmentally harsh due to its non-biodegradable characteristics. By way of example, a series of substantially circular gaskets stamped from a sheet of gasket material according to the aforementioned process would yield a series of circular gaskets, however, the majority of the surface area of the initial sheet of gasket material including the area positioned inside and outside of the stamped circular rings would typically be discarded.

Figures 4A, 4B, 4C:
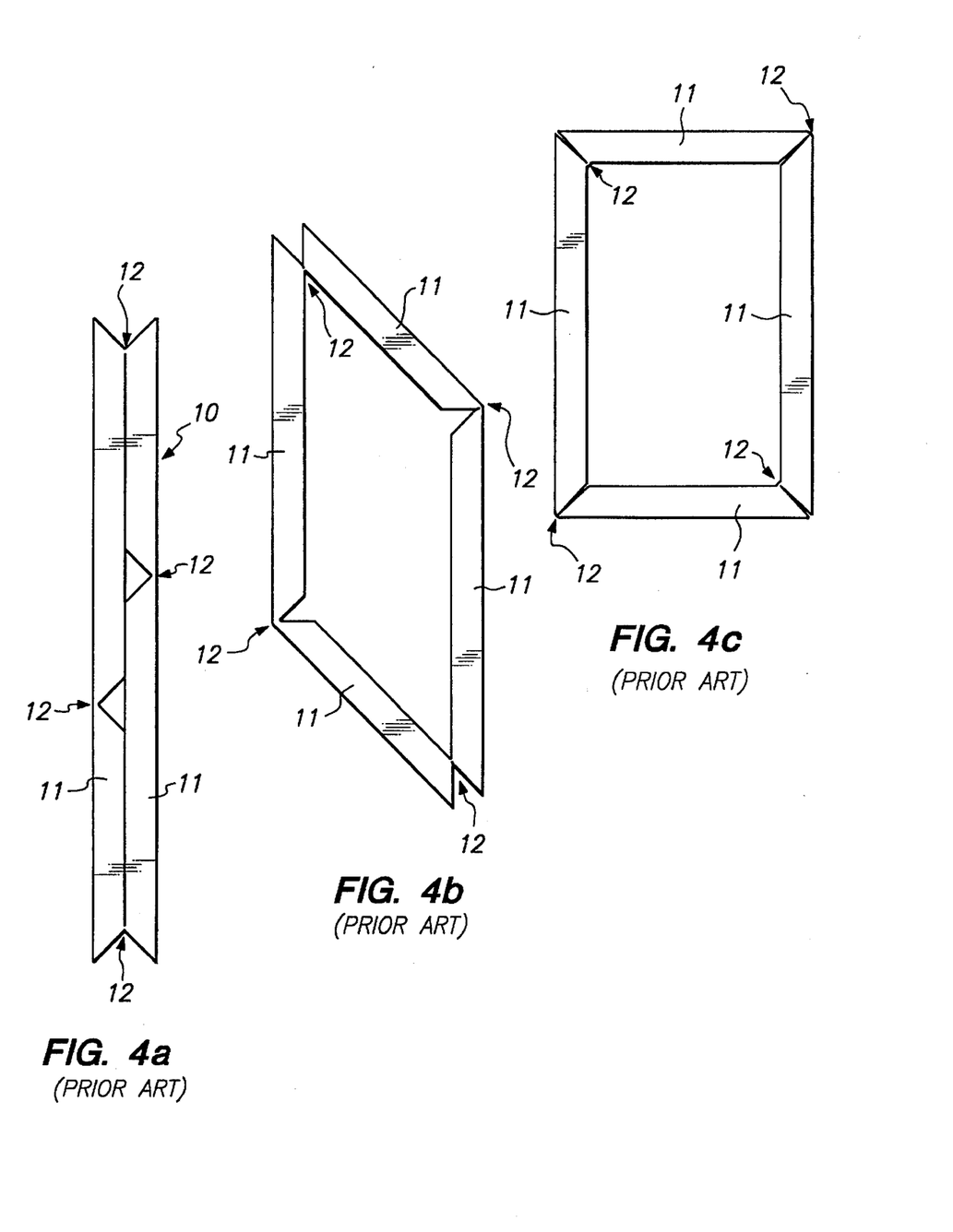
FIGS. 4a, 4b, and 4c show an alternative conventional die cut gasket; an intermediately expanded position of the gasket; and a final gasket geometry, respectively.
Figure 5:
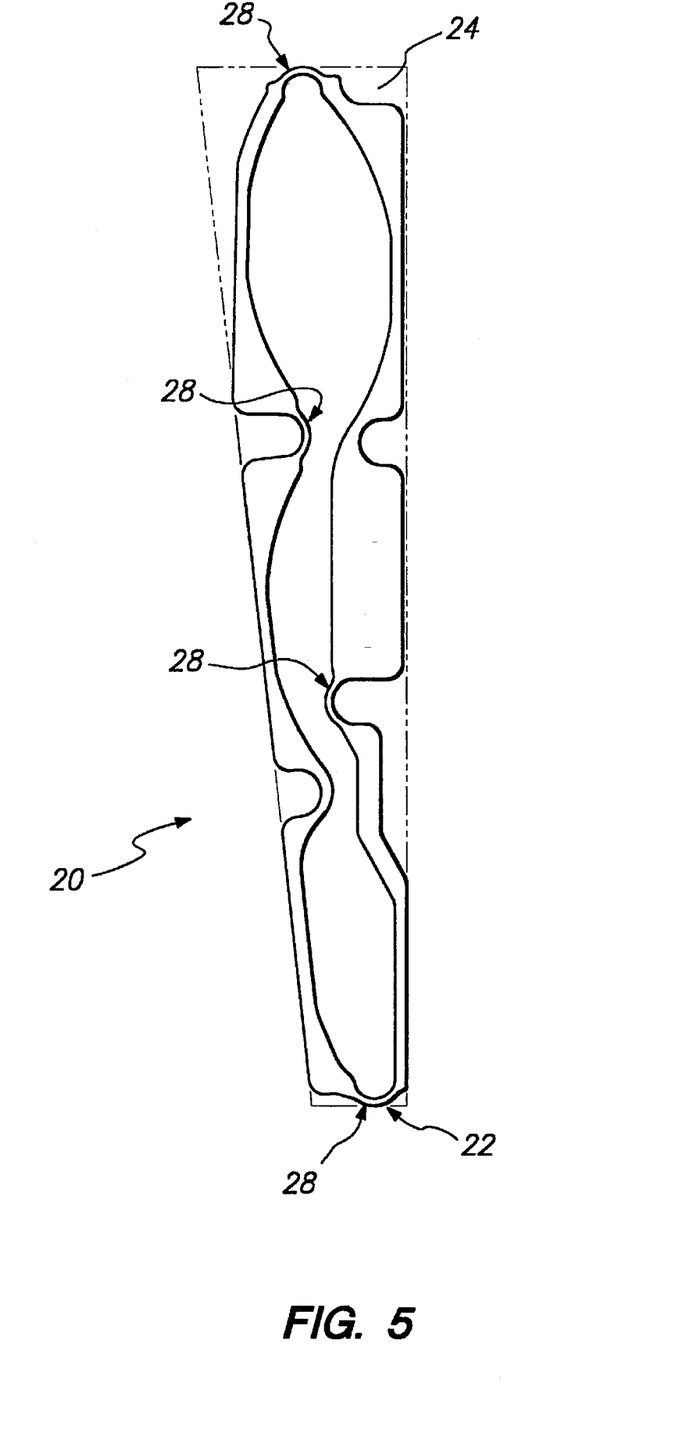
FIG. 5 shows a die cut gasket having a first predetermined geometry.

One method for conserving gasket sheet material is to lay out the gasket patterns in an optimum fashion on the sheet of gasket material. Another method of maximizing the usable surface area of a sheet of gasket material is shown in FIGS. 4a, 4b, and 4c, which illustrate steps of selecting predetermined reconfigurable die geometries as to maximize the number of gaskets realized from a sheet of gasket material. In order to accomplish the aforementioned, gaskets can be stamped from a sheet of material such that a secondary separation and expansion operation is required to configure the gasket into its final form. Specifically, a typical gasket 10 intended to seal the cover or door of an electrical enclosure is initially die stamped from a sheet of gasket material, leaving several strip-like segments 11 connected by "live hinge" regions 12. The gasket 10 is then subsequently unfolded into its final gasket form, which is somewhat analogous to a picture frame. However, after being expanded into a final geometry, the gasket can exhibit severe local deformations in the live hinge corner regions 12. Moreover, as a result of theoretically infinite stresses at the live hinge corner regions 12 caused by the deformations, the gasket material may tear, and consequently not atmospherically seal the enclosure from the outside environment. In some instances atmospheric isolation is not relevant. However, as already explained above, sealing the interior of a disk drive from minute atmospheric particles is critical to proper functioning of the unit.

Therefore, there is a hitherto unsolved need for a gasket design and method that maximizes the number of gaskets realized from a sheet of gasket material, thereby minimizing material waste. There also exists a need for gasket that can be expanded to a desired shape without substantial deformation in order to seal e.g. the HDA of a disk drive from atmospheric contaminants.

SUMMARY OF THE INVENTION WITH OBJECTS

In accordance with the present invention, an expandable gasket is provided for sealing a disk drive's HDA from atmospheric contaminants.

An object of the present invention is to provide a method of manufacturing an expandable gasket for sealing the head disk assembly of a disk drive from atmospheric contamination.

A further object of the present invention is to set forth an improved method for assembling an expandable gasket for sealing e.g. an HDA from contaminants from a collapsed gasket form that maximizes the number of gaskets realized from a sheet of gasket material, thereby minimizing waste products.

An advantage of the expandable gasket for a head disk assembly of a disk drive of the present invention is that the gasket has an initially manufactured first predetermined geometry that maximizes the number of gaskets realized from a sheet of gasket material, and special features of the first geometry permit the gasket to be expanded into a predetermined second geometry for use to seal the disk drive HDA. Therefore, the design minimizes the discard of relatively costly scrap, and reduces an amount of environmentally non-biodegradable scrap plastic material.

In accordance with principles of the present invention, a method is practiced for forming a gasket with a first predetermined geometry and for expanding the gasket from its first predetermined gasket geometry into a second predetermined gasket geometry. The first gasket geometry is specifically dimensioned to yield the maximum number of gaskets from a sheet of gasket material and to facilitate a relatively predictable transformation to the second geometry. The second predetermined geometry is dimensioned to enable the gasket to be disposed in a sealing relationship between the top cover and base of e.g. a hard disk drive.

A method in accordance with the present invention comprises the steps of:

forming a series of gaskets following a predetermined first gasket geometry on the surface area of a sheet of gasket material, wherein each first gasket geometry is dimensioned and positioned on the sheet to minimize material waste, the first gasket geometry having several complimentary pairs of relatively thinned elongate pivot regions separated by gasket segments;

separating the series of gaskets in the first gasket geometry from the remainder of the sheet of gasket material; and, bending each of the pivot regions of the complimentary pairs with equal force in opposing directions, thereby transforming each gasket into the second gasket geometry; the pivot regions of the first gasket geometry being deformed into pivot regions of different shape in the second gasket geometry. In one example, the pivot regions are curved in the first, closed geometry, and are relatively straightened when the gasket is expanded to the open, second gasket geometry.

In another facet of the invention, a gasket is die-cut from a sheet of gasket material. The gasket has a first, collapsed geometry and a plurality of spaced-apart thinned and relatively elongated pivot regions such that the gasket expands to a second, opened functional geometry without any substantial deformation of gasket material within the elongated pivot regions.

In one more facet of the invention, a method is provided for expanding a gasket die-cut from a sheet of gasket material from a first, collapsed geometry to a second, open functional geometry, the gasket comprising a plurality of spaced-apart, thinned, and relatively elongate pivot regions separated by widened gasket segments, the pivot regions being e.g. relatively curved in the first, collapsed geometry and being e.g. relatively straightened in the second, open functional geometry. The method comprises the steps of:

engaging the widened gasket segments with an articulated pantographic fixture in a first configuration conforming to the first, collapsed geometry while supporting but not engaging the plurality of spaced-apart, thinned and relatively elongate curved pivot regions, articulating the fixture while engaging the widened gasket segments from the first configuration conforming to the first, collapsed geometry to a second configuration conforming to the second, open functional geometry thereby expanding the gasket to an operating functional orientation, installing the expanded gasket in the operating functional orientation onto a workpiece, and disengaging the widened gasket segments thereby to release the gasket and workpiece.

Within this facet of the invention, the workpiece comprises a cover for a head-disk assembly of a disk drive, and the step of installing the expanded gasket in the operating functional orientation onto the cover comprises the steps of aligning the cover with the gasket as carried on the fixture at the second configuration and pressing an adhesive-coated outer surface of the expanded gasket onto the cover.

These and other objects, advantages, aspects and features of the present invention will be more fully understood and appreciated upon consideration of the following detailed description of a preferred embodiment, presented in conjunction with the accompanying drawings.

DETAILED DESCRIPTION OF THE PREFERRED EMBODIMENT

Figure 6:
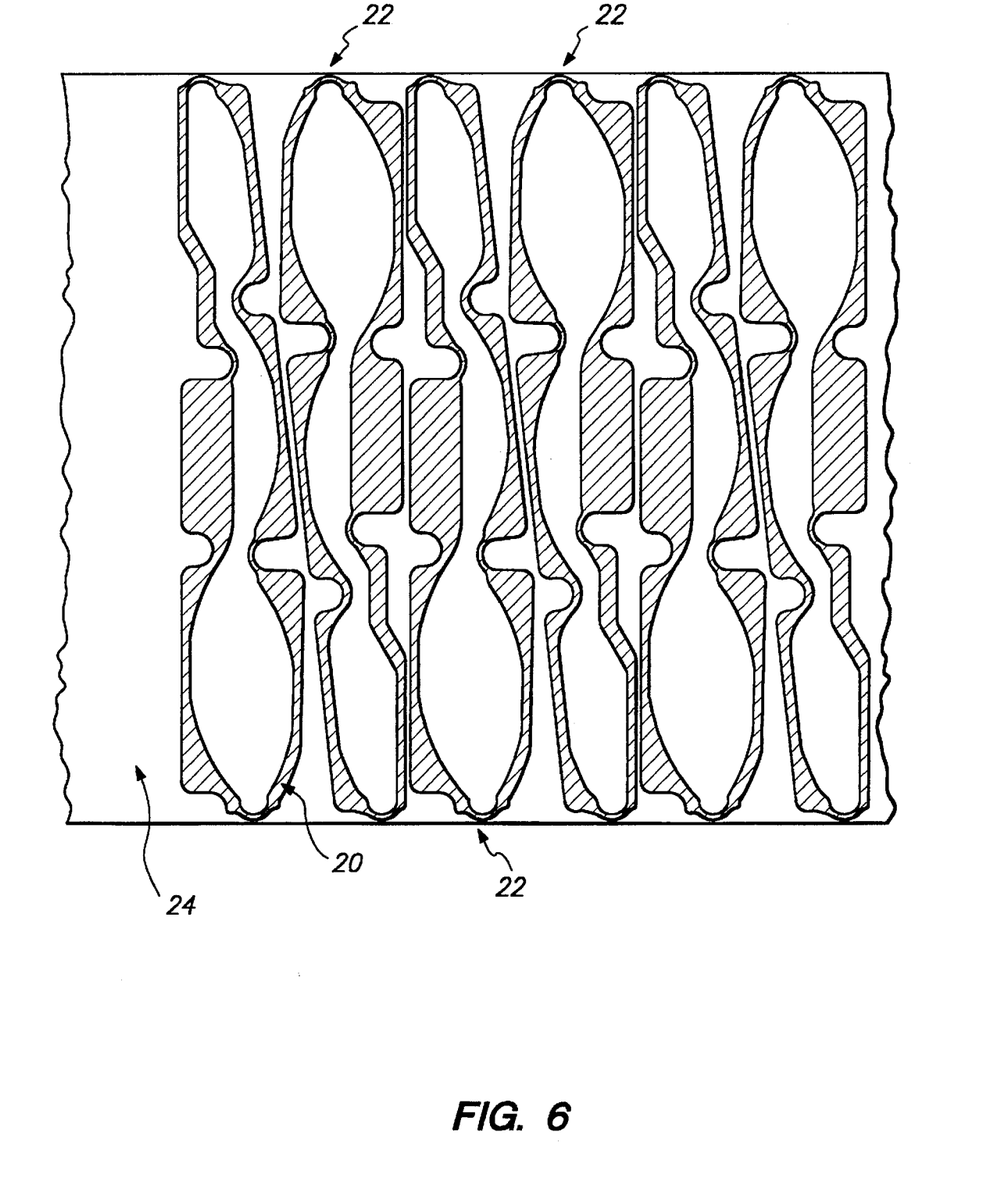
FIG. 6 shows a plurality of die cut gaskets according to the present invention disposed on a sheet of gasket material.
Figure 7:
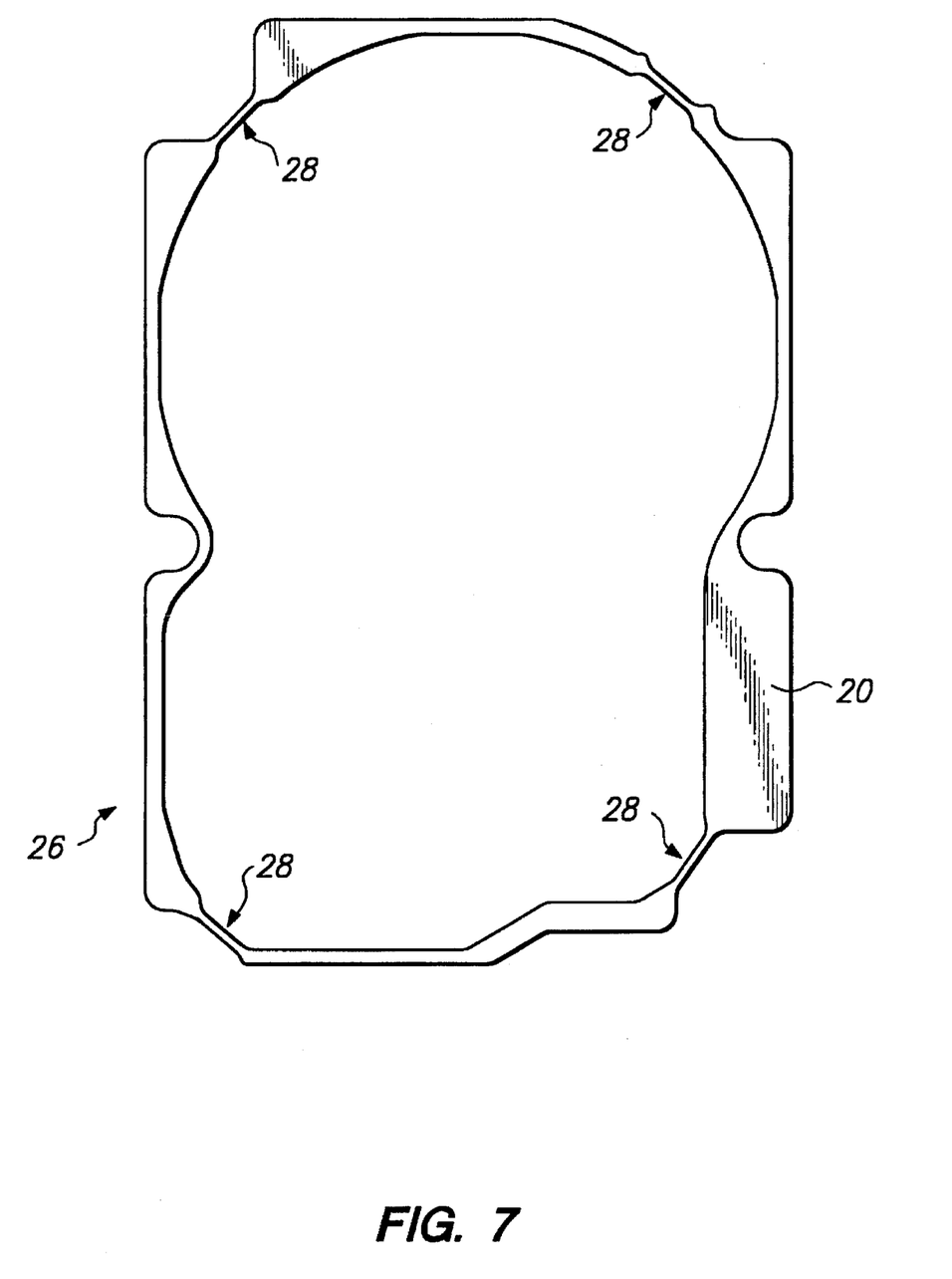
FIG. 7 shows the die cut gasket of the first predetermined geometry distended into a second predetermined geometry.

In accordance with the present invention provided herein and as illustrated in FIGS. 5–15, a gasket 20 has a first, collapsed gasket geometry 22 with initial dimensions selected to maximize a number of gaskets 20 which may be realized from a single sheet of gasket material 24 (FIG. 6). The first gasket geometry 22 also has geometric features that enable the gasket 20 to be expanded into a second predetermined geometry 26 (shown in FIG. 7) without stretching the gasket's material. Accordingly, material is repositioned or expanded to form a second predetermined geometry 26. The dimensions of the second gasket geometry 26 are such that when the gasket 20 is positioned (in its second geometry 26) between the top cover 3 and base 2 of e.g. the FIG. 1 disk drive assembly 1, an air tight seal is established therebetween.

The material nature of the gasket 20 of the instant invention is particularly suited to the application of disk drives due to its low outgassing, low compression set, flat profile, and relative compatibility with the internal components 4 of a disk drive.

A method of fabricating gaskets 20 having the first gasket geometry 22 and second gasket geometry 26 comprises the steps of:

forming a series of first predetermined gasket geometries 22 on the surface area of the sheet of gasket material 24, wherein each first geometry 22 is dimensioned and positioned on the sheet 24 to minimize material waste, the first geometry 22 having several complimentary pairs of thin pivot regions 28 disposed as e.g. curved sections along a locus of the first geometry;

separating the gaskets 20 in their first gasket geometries 22 from the remainder of the sheet of gasket material 24; and, bending the gasket 20 with equal force in opposing directions such that each of the pivot regions 28 of the complimentary pairs become e.g. relatively straight, such that the gasket 20 follows the second gasket geometry 26. The pivot regions 28 are provided with relatively thin transverse cross sections so dimensioned that they can be bent without buckling or tearing and without developing unacceptably high stress levels within the material during the transformation from the first geometry 22 into the second geometry 26.

Figure 8:
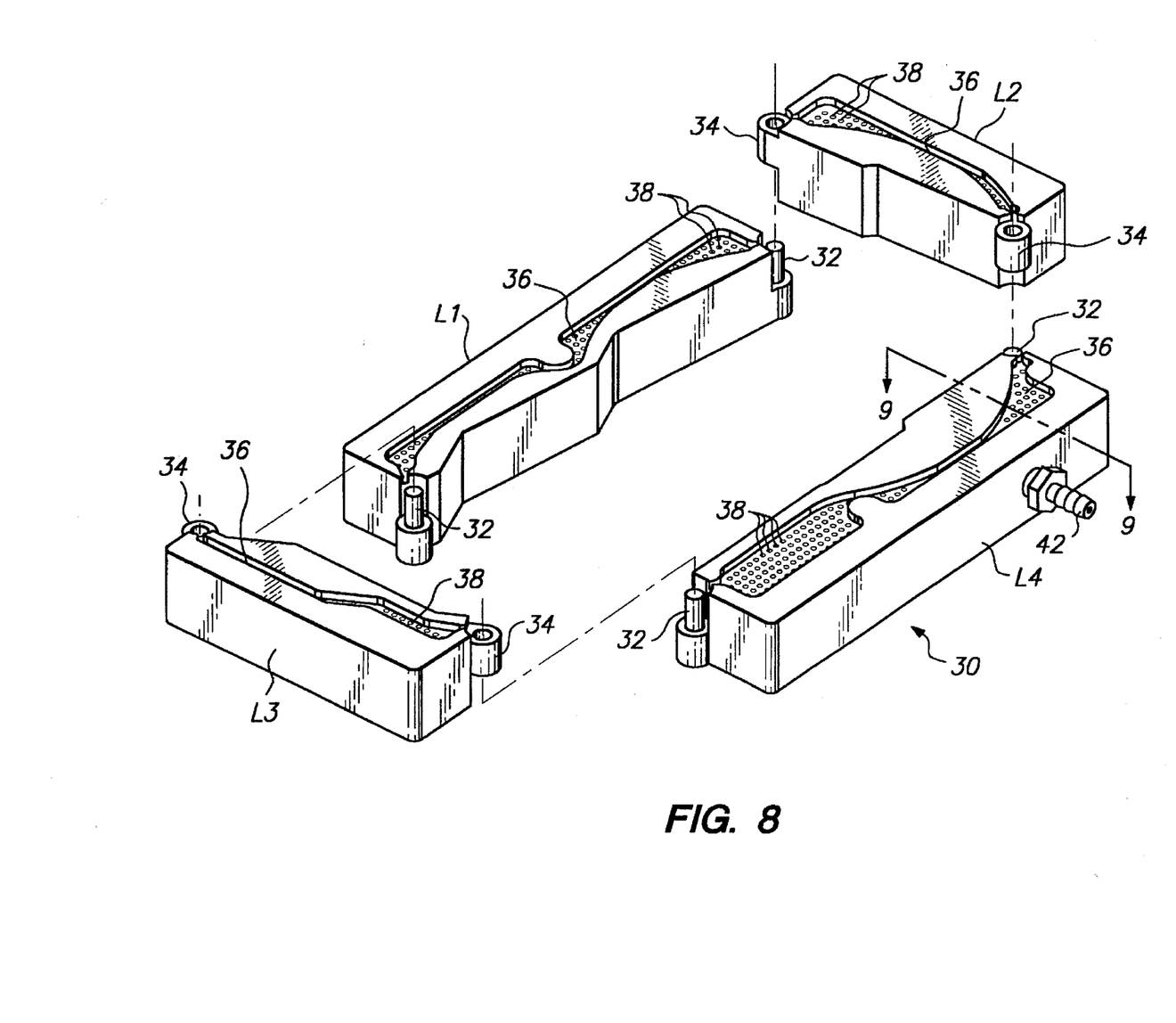
FIG. 8 is an isometric view of a disassembled four-legged vacuum assembly fixture for expanding the FIG. 5 gasket into its second geometry shown in FIG. 7.
Figure 9:
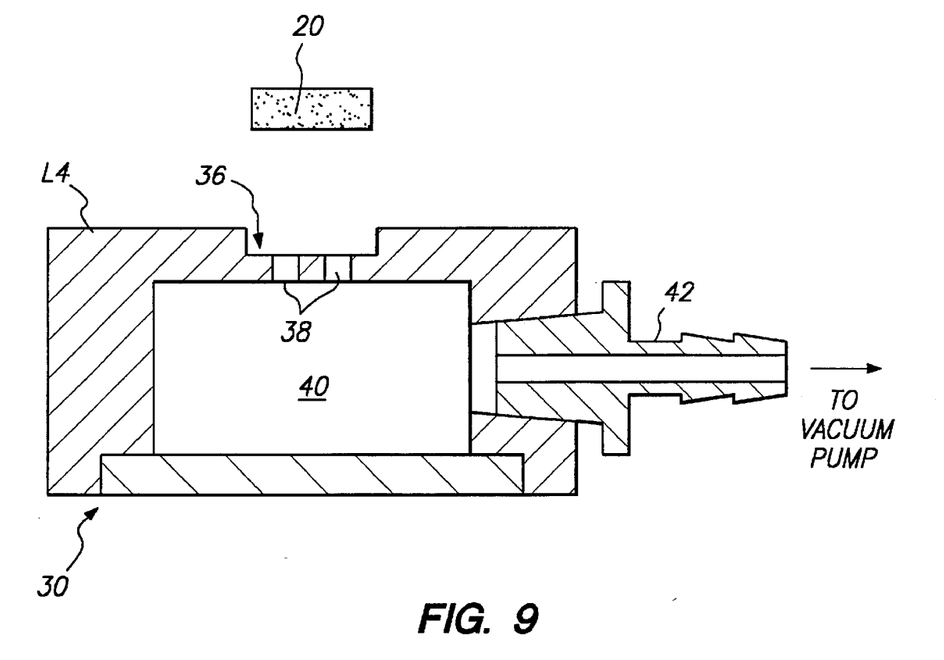
FIG. 9 is a view in elevation and cross-section of the FIG. 8 assembly fixture taken along section line 9—9 in FIG. 8.

More particularly, FIG. 8 illustrates an articulated, four-legged gasket assembly fixture 30 having legs L1, L2, L3 and L4. Legs L1 and L4 define hinge pins 32 while legs L2 and L3 define hinges 34 which engage the hinge pins 32 to enable assembly of the fixture 30 along broken line loci in FIG. 8. Each leg L1, L2, L3 and L4 defines a recess segment, and each recess segment corresponds to one of the legs of gasket 20. A bottom wall of the recess 36 is provided with a grid of holes 38 leading to an internal chamber 40 within each leg as shown in FIG. 9 (which also shows the recess 36 and gasket 20 juxtaposed thereabove). A vacuum fitting 42, also shown in FIG. 9 enables a vacuum line from a vacuum pump (not shown) to be connected to the interior chamber 40. When vacuum is applied at the fitting 42, air is drawn into the chamber 40 through the holes 38, and a difference in air pressure is thereby available and is used to hold the gasket 20 in precise conformable alignment within the fixture surface defining the recess 36.

Figure 10:
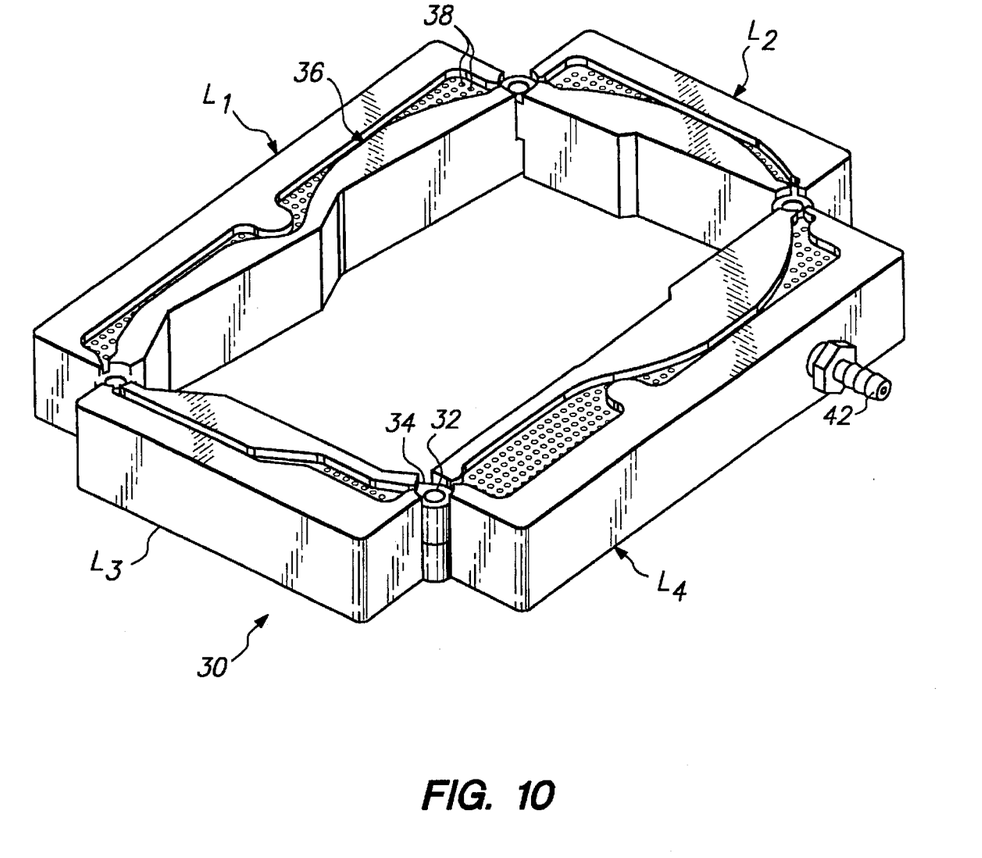
FIG. 10 is a view of the FIG. 8 four-legged vacuum assembly fixture following assembly thereof into an articulated pantographic structural geometry.
Figure 11:
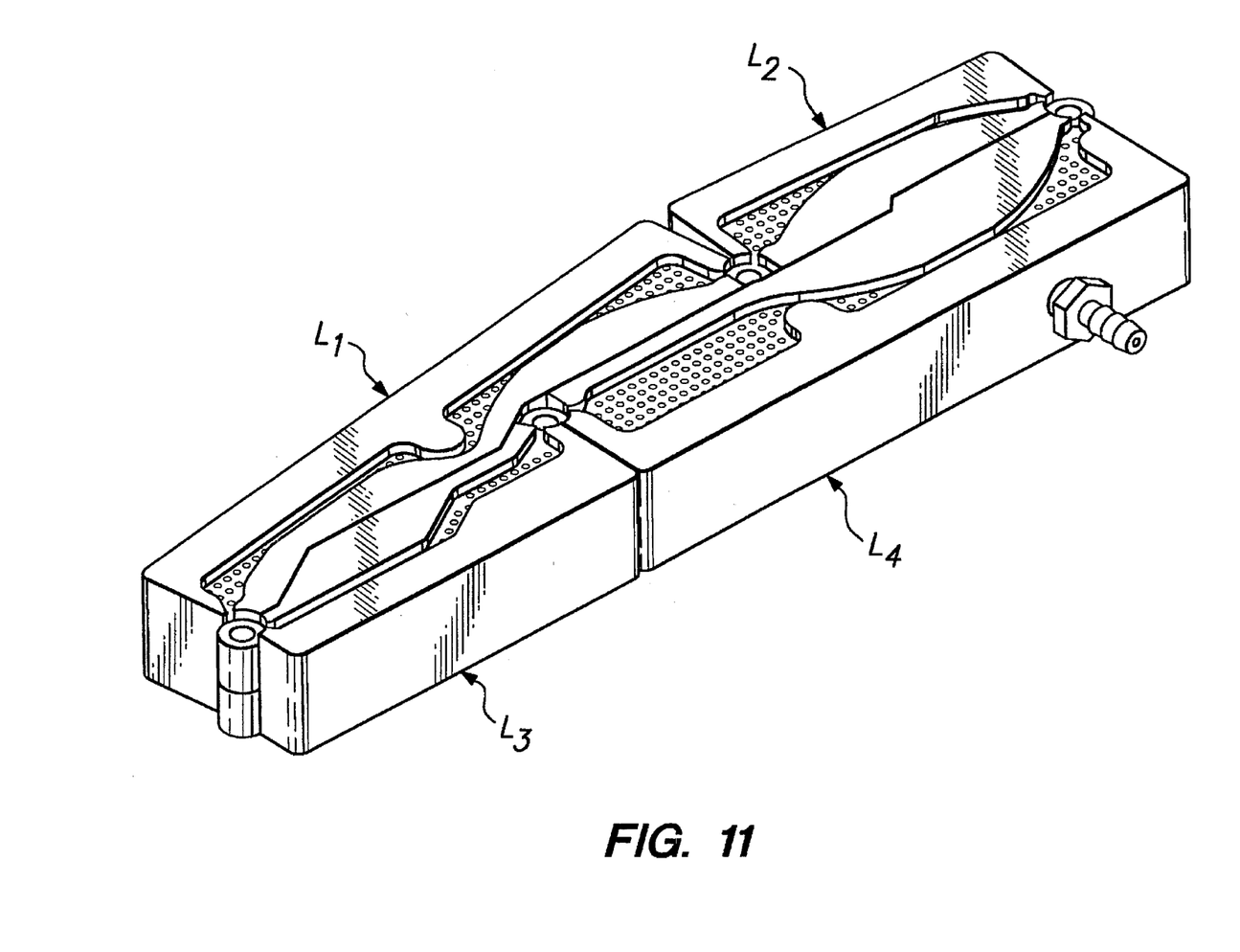
FIG. 11 shows the FIG. 10 assembly collapsed to follow the first predetermined geometry of the FIG. 5 gasket.

FIG. 10 illustrates the fixture 30 after assembly in the distended or open position. In the position illustrated in FIG. 10, the outline of the milled recess 36 closely matches the final design, second shape 26 of the expanding gasket 20 as it will be installed on the disk drive cover 3. While the vacuum fitting is only illustrated in leg L4, it will be appreciated that the other legs L1, L2 and L3 have similar connections to the vacuum supply.

Now, the action of the fixture 30 as a four-bar linkage will be considered. If, from the open position shown in FIG. 10, leg L1 is fixed, and legs L2 and L3 are rotated in a counterclockwise direction with respect to leg L1 until a limit of mechanical motion is reached, the closed position shown in FIG. 11 will be reached. By this design, in the FIG. 11 closed position, the outline of the milled recess 36 of legs L1, L2, L3 and L4 closely match the initial, die-cut first geometry 22 of the expanding gasket 20 in its first form.

Figure 12:
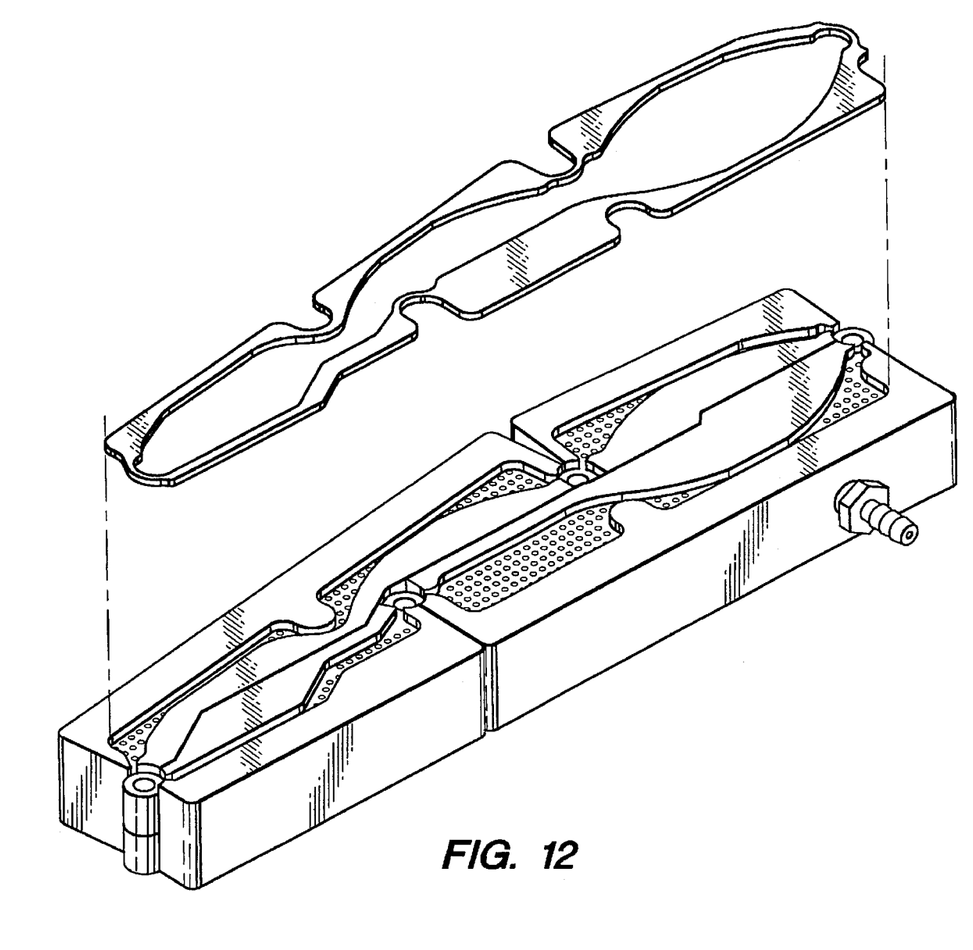
FIG. 12 shows the relative alignment of the FIG. 5 gasket with a recess of the FIG. 11 fixture assembly.
Figure 13:
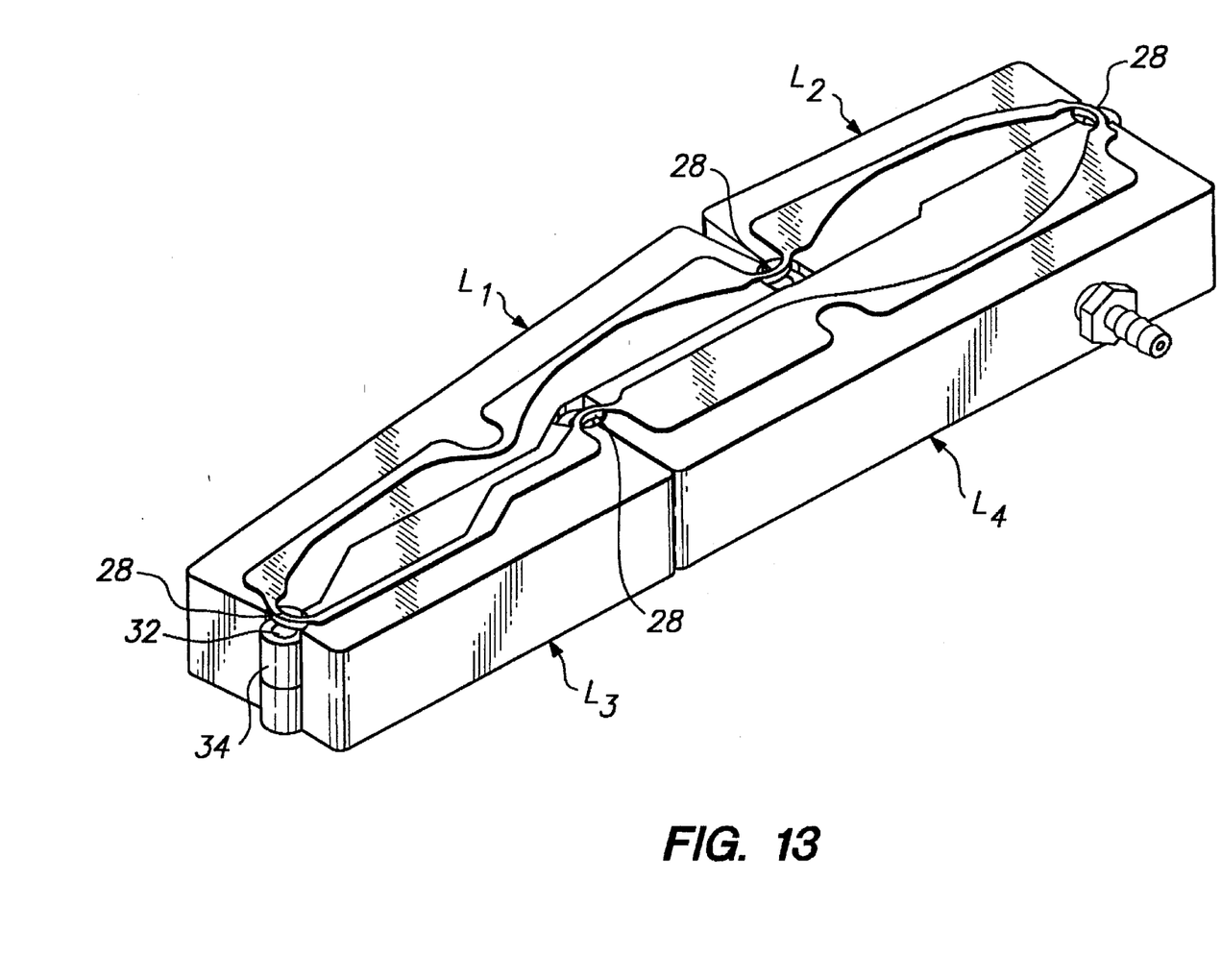
FIG. 13 shows the FIG. 5 gasket held to a conformable recess of the FIG. 11 fixture by vacuum pressure.

FIG. 12 shows the fixture 30 in its closed position ready to receive the expanding gasket 20 in its as-die-cut shape or first geometry 22. FIG. 13 shows the expanding gasket 20 in its first geometry seated in position within the recess 36 and is constrained within the recess 36 by vacuum pressure, except for the four pivot regions 28 which lie directly upon the top face portion of hinge elements 32 and 34. It is important to note that the absence of constraining force upon the pivot regions 28 enables them to undergo a gentle bending-straightening motion when the expanding gasket is expanded from the closed position first geometry 22 to the expanded, open second geometry 26.

Figure 14:
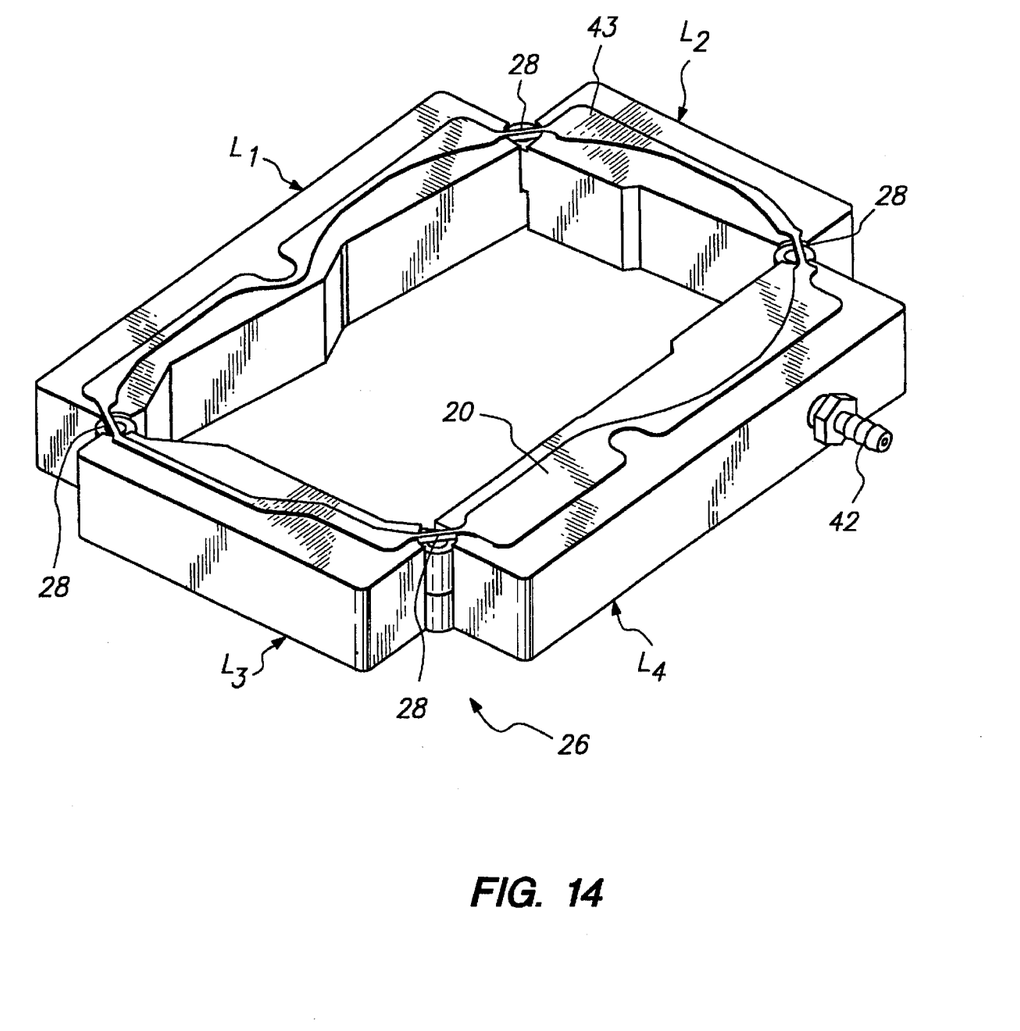
FIG. 14 shows the FIG. 13 fixture assembly moved to a distended or opened position, thereby distending the FIG. 5 gasket to follow its FIG. 7 second geometry.

Next, the articulation process of the fixture 30 is reversed. If, from the closed position 22 shown in FIG. 13, leg L1 is fixed and legs L2 and L3 are rotated in a clockwise direction with respect to leg L1 while maintaining vacuum pressure to the legs L1-4, the fixture 30 and the gasket 20 will arrive at the open position following the second geometry 26, as shown in FIG. 14, wherein the pivot regions 28 have become relatively straightened without any significant deformation or distortion. The portions 28 remain supported in desired position by the top face portions of the hinge components 32 and 34.

Thus, FIG. 14 illustrates the gasket 20 in its expanded, ready-to-install open shape in accordance with the second geometry 26. In comparing the views of FIGS. 13 and 14 it should be noted that the narrowed pivot regions 28 which were gently curved in the original as-die-cut shape of the first geometry 22 are now substantially straight in the expanded shape of the second geometry 26. The bending without deformation of the pivot regions 28 is unconstrained by the milled recess 26 and vacuum pressure applied to the remainder of the gasket 20 during the opening operation.

Figure 15:
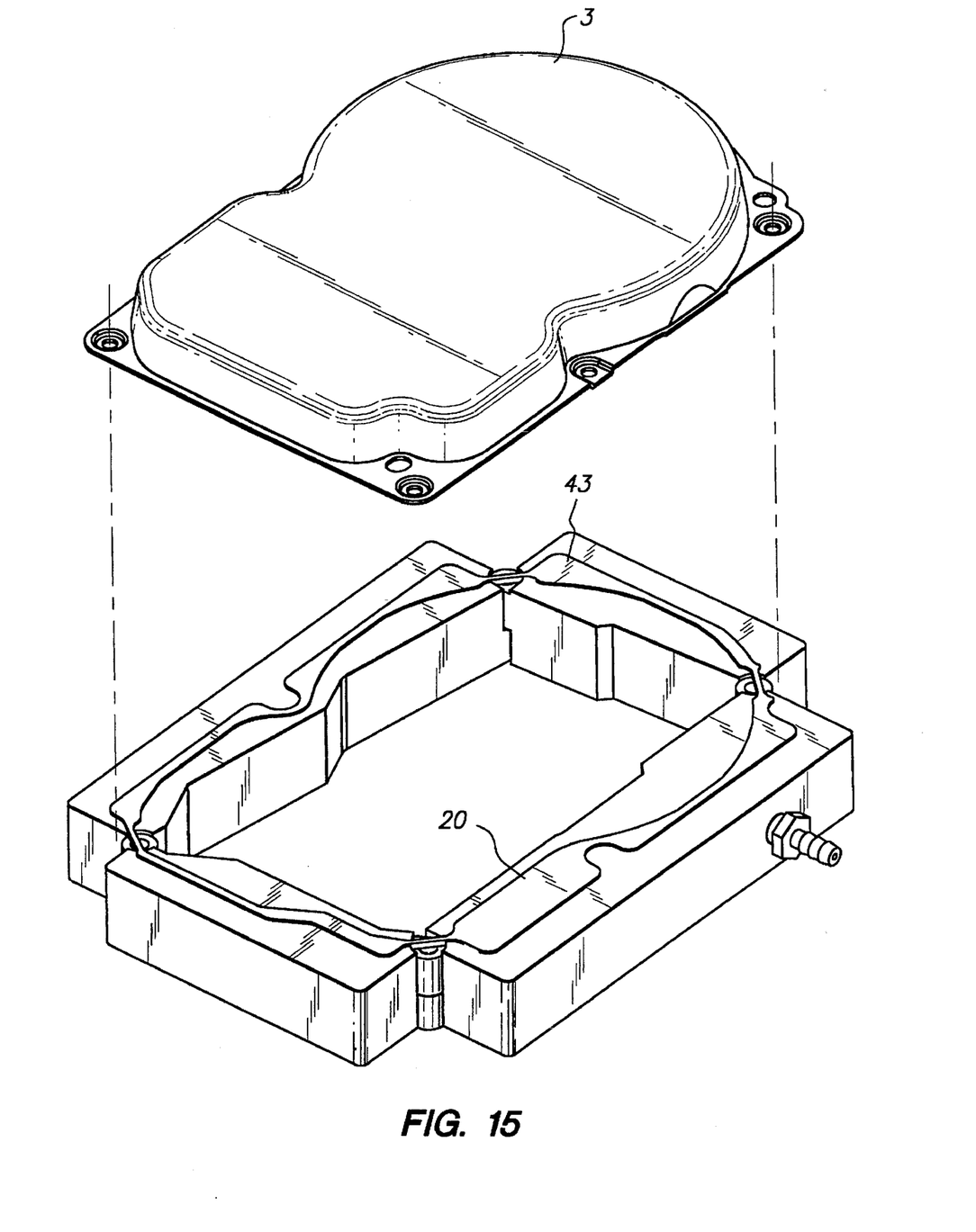
FIG. 15 shows the FIG. 14 fixture-gasket combination in assembly alignment with the HDA cover shown in FIG. 1, representing a final assembly step.

FIG. 15 shows the typical disk drive cover 3 ready to be installed on the gasket 20 and fixture 30. As mentioned above in connection with the FIG. 3 conventional fixture, the installation is preferably accomplished with aid of suitable tooling pins or fixtures (not shown) provided on the fixture 30 in order to ensure a precise alignment between the gasket 20 and the cover 3. Once the cover 3 is properly aligned, the cover 3 is brought into contact with an adhesively coated outer surface 42 of the gasket 20, and the gasket becomes bonded in desired position to the cover 3. When the cover 3 is attached to the base 2, the gasket 20 is carried into a desired sealing arrangement between the cover 3 and wall 13 of the base 2.

The assembly steps for installing the expanding gasket 20 onto the disk drive cover 3 are similar to those described above in connection with the non-expanding gasket 5 depicted in FIG. 2. In a manual process:

1. The fixture 30 is placed into its closed position in accordance with the first geometry 22, and vacuum is turned off.

2. The gasket 20, in its as-die-cut shape in accordance with the first geometry 22 is placed loosely into the milled recess 36 of the fixture 30, adhesive side up.

3. Vacuum is turned on. An operator manipulates the gasket, if necessary until it lies flat and completely within the recess 36.

4. Any paper release liner covering the adhesive coating is removed.

5. The fixture 30 is moved to its open position in accordance with the second geometry 26 while vacuum continues to be applied; this operation expands the gasket 20 to its ready-to-install shape in accordance with the second geometry.

6. If necessary, adhesive is applied to the exposed outer surface 42 of the gasket 20.

7. The cover 3 is installed on the gasket, preferably with the aid of tooling pins or other registration features of the fixture 30.

8. Vacuum is turned off, and the cover 3, with gasket 20 now in place, is removed from the fixture 30.

In an automated assembly process, the steps are essentially the same. However, the entire fixture 30 is preferably turned upside down and becomes an end effector of a robotic arm. The fixture 30 uses vacuum pressure to pick up the as-die-cut gasket 20 in its first geometry 22 from a release sheet or belt, expand it to its open, ready-to-install shape following the second geometry 26, translate the opened gasket 20 to the cover, press the gasket 20 into the cover in proper registration to install it, and release the vacuum, before returning automatically to repeat these steps for the next gasket which would then automatically move into position on the release sheet or belt (along with a second cover). These steps are then automatically repeated in an automated manufacturing operation.

In the exemplary expanding gasket 20 described herein, th pivot regions have been described as having a "curved" first geometry 22 and as having a "straight" second geometry 26. These features should be considered to be examples only. Alternatively, the thinned pivot regions 28 may be "straight" in the closed geometry 22, and "curved" in the open second geometry 26. Or, the regions 28 may be curved in one direction in the closed first geometry 22, and curved in an opposite direction in the open second geometry 26, depending upon a particular gasket design.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of expanding a gasket from a first gasket geometry to a second gasket geometry, wherein the second gasket geometry is dimensioned to be disposed between a disk drive's base and top cover, comprising the steps of:

forming a series of first predetermined gasket geometries on the surface area of a sheet of gasket material, wherein the first geometry is dimensioned and positioned on the sheet to minimize material waste, the first geometry having several complimentary pairs of curved pivot regions disposed along the periphery of the first geometry;

separating the first predetermined gasket geometries from the remainder of the sheet; and bending each of the pivot regions of the complimentary pairs with equal force in opposing directions, thereby forming the second gasket geometry, wherein the pivot regions of the first gasket geometry are curved and wherein the step of bending each of the pivot regions effectively straightens each pivot region at the second geometry.

2. The method of expanding a disk drive's head disk assembly gasket from a first gasket geometry to a second gasket geometry set forth in claim 1, wherein the first gasket geometry is expanded to form the second geometry without stretching the gasket material.

3. The method of expanding a disk drive's head disk assembly gasket from a first gasket geometry to a second gasket geometry set forth in claim 2, wherein the pivot regions are dimensioned to have a relatively thinned traverse cross section to avoid gasket buckling.

4. The method of expanding a disk drive's head disk assembly gasket from a first gasket geometry to a second gasket geometry set forth in claim 3, wherein the second geometry is dimensioned to form a conforming relationship with the top cover and base of a disk drive.

5. The method of expanding a disk drive's head disk assembly gasket from a first gasket geometry to a second gasket geometry set forth in claim 4, wherein the second geometry is dimensioned to form a conforming air tight relationship between the top cover and base portions of a disk drive.

6. The method of expanding a disk drive's head disk assembly gasket from a first gasket geometry to a second gasket geometry set forth in claim 5, wherein the second gasket geometry has low outgassing.

7. The method of expanding a disk drive's head disk assembly gasket from a first gasket geometry to a second gasket geometry set forth in claim 6, the second gasket geometry has a flat profile.

8. The method of expanding a disk drive's head disk assembly gasket from a first gasket geometry to a second gasket geometry set forth in claim 7, the second gasket geometry has a low compression set.

9. A method for expanding a gasket die-cut from a sheet of gasket material from a first, collapsed geometry to a second, open functional geometry, the gasket comprising a plurality of spaced-apart, thinned, and relatively elongate pivot regions separated by widened gasket segments, the pivot regions having a first shape in the first, collapsed geometry and having a second shape in the second, open functional geometry, the method comprising the steps of:

engaging the widened gasket segments with an articulated pantographic fixture in a first configuration conforming to the first, collapsed geometry while supporting but not engaging the plurality of spaced-apart, thinned and relatively elongate pivot regions, articulating the fixture while engaging the widened gasket segments from the first configuration conforming to the first, collapsed geometry to a second configuration conforming to the second, open functional geometry thereby expanding the gasket to an operating functional orientation, installing the expanded gasket in the operating functional orientation onto a workpiece, and disengaging the widened gasket segments thereby to release the gasket and workpiece.

10. The method set forth in claim 9 wherein the workpiece comprises a cover for a head-disk assembly of a disk drive, and the step of installing the expanded gasket in the operating functional orientation onto the cover comprises the steps of aligning the cover with the gasket as carried on the fixture at the second configuration and pressing an adhesive-coated outer surface of the expanded gasket onto the cover.

11. The method set forth in claim 9 wherein the first shape of the pivot regions in the first, collapsed geometry is relatively curved, and the step of articulating the fixture expand the gasket causes the second shape in the second, open functional geometry to be relatively curved relative to the first shape.

* * * * *